*US007779121B2*

US007779121B2

(12) United States Patent
Salo et al.

(10) Patent No.: US 7,779,121 B2
(45) Date of Patent: Aug. 17, 2010

(54) METHOD AND APPARATUS FOR DETECTING CLICK FRAUD

(75) Inventors: Juha Salo, Littoinen (FI); Ahti Muhonen, Hirvihaara (FI)

(73) Assignee: Nokia Corporation, Espoo (FI)

( * ) Notice: Subject to any disclaimer, the term of this patent is extended or adjusted under 35 U.S.C. 154(b) by 238 days.

(21) Appl. No.: 11/975,426

(22) Filed: Oct. 19, 2007

(65) Prior Publication Data

US 2009/0106413 A1    Apr. 23, 2009

(51) Int. Cl.
    *G06F 15/173*    (2006.01)
(52) U.S. Cl. ........................ 709/224; 709/223
(58) Field of Classification Search .............. 709/223, 709/224
    See application file for complete search history.

(56) References Cited

U.S. PATENT DOCUMENTS

| 5,805,159 | A | 9/1998 | Bertram |
| 2006/0265493 | A1* | 11/2006 | Brindley et al. ............. 709/224 |
| 2007/0033106 | A1 | 2/2007 | Mason |
| 2007/0061211 | A1 | 3/2007 | Ramer |
| 2009/0006575 | A1* | 1/2009 | Hulten et al. ............... 709/207 |
| 2009/0006991 | A1* | 1/2009 | Lindberg et al. ............ 715/763 |

FOREIGN PATENT DOCUMENTS

| JP | 2001-230859 | 8/2001 |
| WO | WO 03/007135 | 1/2003 |
| WO | WO 2006/094449 | 9/2006 |

OTHER PUBLICATIONS

Smith, "A Thorny Issue: Detecting Mobile Search Click-Fraud", http://searchengineland.com/070903-083455.php, Sep. 3, 2007.

* cited by examiner

*Primary Examiner*—Wing F Chan
*Assistant Examiner*—Andrew Woo
(74) *Attorney, Agent, or Firm*—Ditthavong Mori & Steiner, P.C.

(57) ABSTRACT

Detecting click fraud at a user device involves detecting a event targeted to a network service that is rated based on the number of individuals who access the network service. The event is of a type associated with user interface selections. It is determined whether the user device is in a low-power state contemporaneously with the detection of the event. The event is caused to be disregarded for the purposes of rating the network service based on a determination that the user device was in the low power state contemporaneously with the detection of the event.

22 Claims, 6 Drawing Sheets

METHOD AND APPARATUS FOR DETECTING CLICK FRAUD

FIELD OF THE INVENTION

This invention relates to preventing click fraud such as in computing device advertisements.

BACKGROUND OF THE INVENTION

Pay per click advertising involves a Web site operator or publisher displays selectable (or "clickable") links from advertisers. In exchange for displaying the ad, the advertiser pays the operator based on actual exposure of the ad, measured by the number of clicks on the ad. One measure used in the industry is the so called "click-through rate," which is the ratio between the number of viewers who clicked on the ad compared to the number of users who were presented with the ad.

Although clicks and click-through rates are relatively easy to measure, they are susceptible to unscrupulous manipulation. For example, the operator of the Web site who is paid based on the number of clicks on advertising hosted by his or her site has a financial incentive to "fool" the system to increase the apparent number of clicks. This imitation of a person clicking on an advertisement through the use of a computer program or script is known as "click fraud." Other individuals and organizations that do not have a direct financial incentive may also have some incentive to commit click fraud. For example, an organization may benefit indirectly by driving up the click rates on a competitors ads, thereby causing the competitor to expend more money for ads than warranted by actual usage. Similarly, individuals who have a grievance against an organization may also commit click fraud in order to reduce the organizations return on advertising expenditures.

Internet advertising can be quite valuable, and click-through rates, while not perfect, are still an easily quantifiable measure of an ad's success. As a result, finding new and improved ways to prevent click fraud is desirable.

SUMMARY OF THE INVENTION

To overcome limitations in the prior art described above, and to overcome other limitations that will become apparent upon reading and understanding the present specification, the present invention discloses a system, apparatus and method for preventing click fraud in computing devices. In accordance with one embodiment of the invention, a method involves detecting, at a user device, an event targeted to a network service. The network service is rated based on the number of individuals who access the network service, wherein the event is of a type associated with user interface selections. It is determined whether the user device is in a low-power state contemporaneously with the detection of the event. The event is caused to be disregarded for the purposes of rating the network service based on the determination that the user device was in the low power state contemporaneously with the detection of the event.

In a more particular embodiment of the method, determining whether the user device is in a low power state involves determining whether a display of the user device is in a low power state. In such a case, determining whether the display is in a low power state may involve determining whether a backlight of the display is in a low power state, such as the backlight being turned off and/or dimmed.

In a more particular embodiment of the method, the event originates from malware installed on the user device, and the malware simulates user selection events. In such a case, the method may further involve notifying the user of a possible malicious program residing on the user device in response to disregarding the event.

In other more particular embodiments, the network service includes network-based advertising, and the event is disregarded for the purposes of determining advertising fees. In another case, causing the event to be disregarded may involve a) blocking the event at the user device; b) causing the event to be disregarded comprises adding the data to a network request initiated in response to the event, where the added data causes the network request to be flagged as suspect; and/or c) disregarding the event comprises redirecting a network request initiated in response to the event to a network address that is different than an address of the network service.

In another embodiment of the invention, an apparatus includes a network interface, memory; and a processor disposed between the memory and the network interface. The memory stores instructions that cause the processor to detect an event targeted to a network service that is rated based on the number of individuals who access the network service. The event is of a type associated with user interface selections. The instructions further cause the processor to determine whether the apparatus is in a low-power state contemporaneously with the detection of the event, and cause the event to be disregarded for the purposes of rating the network service based on the determination that the apparatus was in the low power state contemporaneously with the detection of the event.

In a more particular embodiment, the apparatus further includes a backlit display, and the instructions cause the processor to determine whether the apparatus is in a low power state based on determining whether the backlit display is in a low power state. In one variation, the memory further includes malware that simulates user selection events, and the event originates from the malware. In such a case, the instructions may further cause the processor to notify the user of a possible malicious program residing on the user device in response to disregarding the event.

In another more particular embodiment, the apparatus further includes a database storing rules that determine whether connections to particular network entities should be analyzed. In such a case, the instructions cause the processor to determine whether the apparatus is in the low-power state contemporaneously with the detection of the event only if the event is targeted to one of the particular network entities. In various arrangements, the instructions cause the event to be disregarded by blocking a network request from being sent via the network interface in response to the event, and/or adding data to a network request that is sent in response to the event, such that the added data causes the network request to be flagged as suspect.

In another embodiment of the invention, a computer-readable storage medium has instructions executable by a processor of an apparatus for: a) detecting a event targeted to a network service that is rated based on the number of individuals who access the network service, such event being of a type associated with user interface selections; b) determining whether the apparatus is in a low-power state contemporaneously with the detection of the event; and c) causing the event to be disregarded for the purposes of rating the network service based on the determination that the apparatus was in the low power state contemporaneously with the detection of the event.

In another embodiment of the invention, an apparatus includes: a) means for detecting a event targeted to a network service that is rated based on the number of individuals who access the network service (the event is of a type associated with user interface selections); b) means for determining whether the user device is in a low-power state contemporaneously with the detection of the event; and c) means for disregarding the event for the purposes of rating the network service based on the determination that the user device was in the low power state contemporaneously with the detection of the event.

In another embodiment of the invention, a system includes a network, and a network service accessible via the network. The network service is rated based on the number of individuals who access the network service. The system also includes a user device capable of accessing the network and includes memory and a processor coupled to the memory. The memory stores instructions that causes the processor to: a) detect an event targeted to the network service, where the event is of a type associated with user interface selections; b) determine service, where the event is of a type associated with user interface selections; b) determine whether the user device is in a low-power state contemporaneously with the detection of the event; and c) cause the event to be disregarded for the purposes of rating the network service based on the determination that the user device was in the low power state contemporaneously with the detection of the event.

In a more particular embodiment, the system further includes an analysis server, and the user device causes the event to be disregarded for the purpose of rating the network service by redirecting a network connection opened in response to the event to the analysis server. In such a case, the analysis server may make an independent determination of whether the event should be disregarded for the purposes of rating the network service.

These and various other advantages and features of novelty are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWING

The invention is described in connection with the embodiments illustrated in the following diagrams.

DETAILED DESCRIPTION OF EMBODIMENTS OF THE INVENTION

Figure 1:
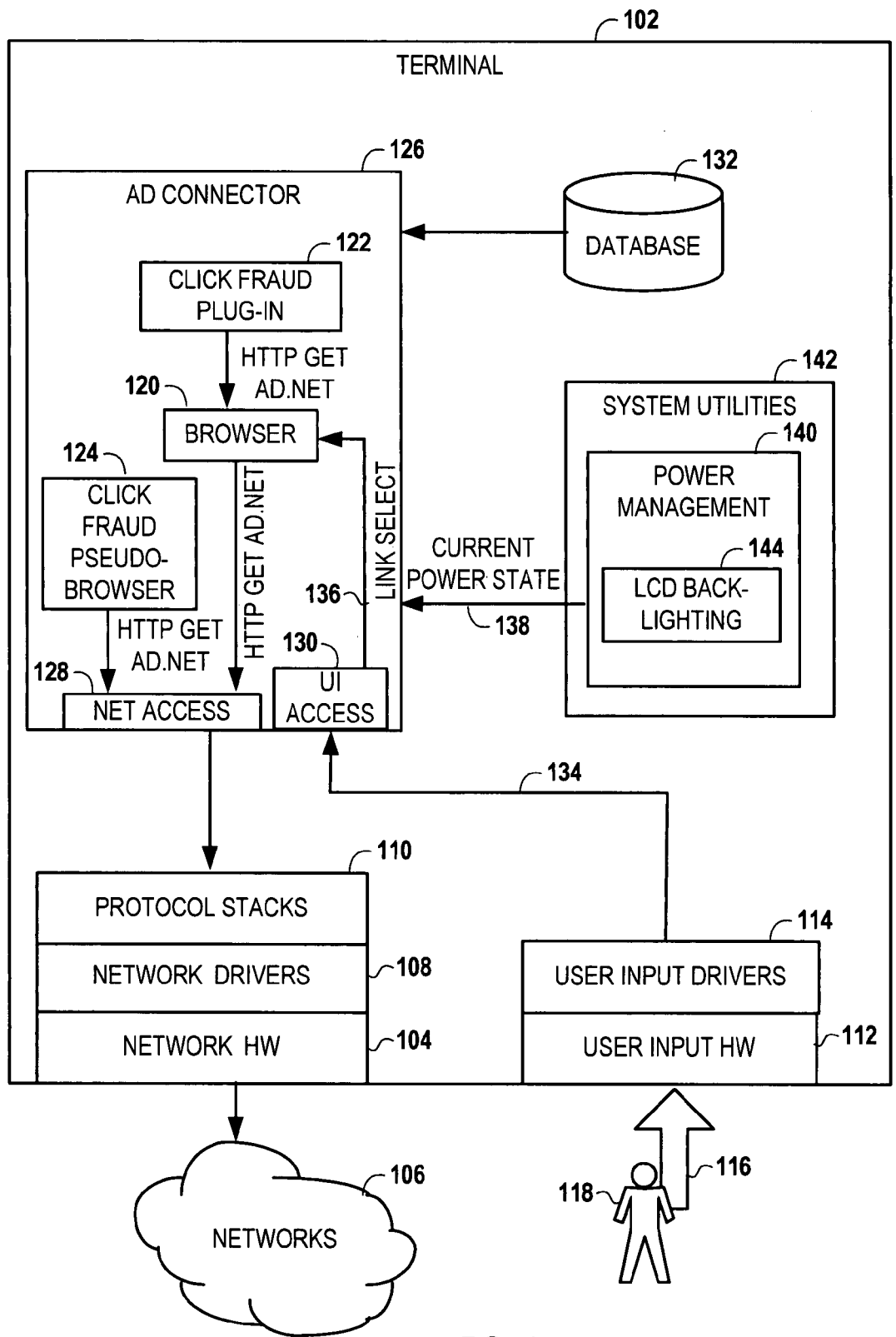
FIG. 1 is a block diagram illustrating a click fraud detection components according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present disclosure is directed to detecting computing events that may be used to perpetuate click fraud and similar schemes. Generally, a terminal implemented component can detect events of a type normally associated with user interface selections, such as the selection of an ad in a browser. These events may be connection events, pseudo user-interface events, application or system Application Program Interface (API) calls, etc. Generally the event results in a request being sent to a network service that may be the target of click fraud or the like. At or about the same time as the detected event, the terminal component can detect certain system states where it would be unlikely or impossible for the user to have clicked. If the event is registered when one of these system states is detected, then the resulting action (e.g., connection to target service) may be disregarded, either by the terminal, the receiving server, and/or some intermediary network element.

One application that is susceptible to click fraud includes pay-per-click advertisements shown in Internet-capable devices. Therefore, the present invention is described largely in this context. Although the present invention may be described in relation to advertising click fraud, the concepts described herein may be applicable to any network service that is evaluated based on the number of individual accesses. For example, such services as online voting and public awareness campaigns may rely on accurate click-through numbers in order to be effective. Similarly, although the invention may be beneficially implemented in mobile devices, such as cell phones, portable media players, personal digital assistants, etc., the concepts may be equally applicable to fixed computing devices such as personal computers (PCs).

Generally, click fraud emulates a user selection by making a network connection to the target network server using a specially crafted Uniform Resource Locator (URL) or other resource identifier. For example, Internet advertisers may desire to drive traffic to a particular Web site for e-commerce by embedding an ad in a popular Web page hosted by a particular publisher. Both the advertiser's and publisher's Web sites may service Hypertext Transport Protocol (HTTP) connection requests. As is well known in the art, a Web page displayed in a browser may contain text and images that are hyperlinked to a URL by way of tags contained in the Web page. So, for example, a user accessing the publishers page (e.g., by linking from another Web page, typing in the URL, selecting a bookmark, etc) would see the publisher's document being displayed in the browser, along with the advertisers content. The advertiser's content may include text, image, or other embedded object that hyperlinks to the advertiser's Web site.

When a user clicks the advertiser's hyperlinked object in a browser or similar application, an HTTP request is sent to the URL described in the link. The URL may contain data that describes the source of the selection (e.g., the publisher's Web site) and other data that enables the advertiser to determine click through rates for that particular source. For example the ad may contain a tag such as <a href="http://ad.adsvr.net/ad?SID=23852">AD TEXT</a> where the words "AD TEXT" appear in the browser display as hyperlinked text. Clicking the hyperlink causes an HTTP connection (e.g., a TCP/IP connection to port 80) to be requested with a server whose Internet Protocol (IP) address maps to "ad.adsvr.net." Assuming the server accepts the HTTP connection, the browser will send a string such as "GET http://ad.adsvr.net/ad?SID=23852 HTTP/1.0" as part of the HTTP protocol. The server will then provide the browser with the advertising document associated with the request. In this example, the URL contains a parameter "SID=23852" which can be used by the server for any purpose. In this example, the parameter "SID=23852" may identify the publisher's site, and may also specify which ad the server is supposed to provide.

The above description is merely one example of how Web advertising can be implemented. Many variations are known in the art. For example, instead of using tags in the Web page to redirect a browser to an ad site, some other selectable object may be used, such as a Java™ Applet, Flash™ animation, browser bookmark/URL component, etc. Further, instead of pointing to the target ad server, the URL may point to an intermediary ad service which intercepts the request, logs the source of the request (e.g., both the machine/browser that generated the request and the Web site from which the request was selected) and then redirects the request to the advertiser's page. The connections to the advertiser and/or intermediary Web site may involve session tracking object such as "cookies" in order to validate requests and correlate this request with other user behavior. It will be appreciate that the connections described herein may be initiated from other programs than browsers (e.g., email client, word processor) and may use other protocols besides HTTP (e.g., HTTPS, FTP, SIP, etc).

In order to perpetuate click fraud, a user may just manually click a browser a large number of times, although this could become quickly tiresome. More commonly, a specialized program or script may be written that emulates a browser. Such a program would automatically and repeatedly access the target URL just as if a user had requested it. Any documents that were returned as part of the transaction could simply be ignored. Such a program could use various techniques to make each request appear to be from a different source, e.g., generation of random cookies, emulation of different types of browsers, use of various alternate routes (if available) to send the requests, generation of random local machine data (e.g., IP address assigned to the Ethernet interface), etc.

One simple way to detect click fraud is to examine the IP address of the HTTP requests and discard additional, multiple requests that originate from the same IP address. However, this may not be desirable given the widespread use of Network Address Translation (NAT) firewalls. A NAT firewall allows a plurality of computers on a LAN to share a single public IP address. The LAN computers use a non-Internet routable network identifier (e.g., 192.168.0.0) and the firewall is set up as the default route. The NAT firewall receives any outgoing connection requests from the LAN, and remaps the IP address—TCP port number pairs (also known as TCP/IP sockets) from the LAN computers to different TCP/IP sockets on the Internet. The NAT firewall maintains a state table for matching up the Internet-side sockets to the LAN side sockets. Therefore, it may not always be assumed that, where a network server sees a number of requests originating from the same IP address, that the requests are all originating from the same computer.

To ensure requests are not coming from the same machine, the advertisers may try to embed into the request machine-specific data, such as local IP address, network interface Media Access Control (MAC) address, CPU identifier, etc. However, this data, unlike the IP address contained in the TCP/IP headers of the request, is not vital to maintaining the TCP/IP connection, and so unless other precautions are taken, this data may be "spoofed." For example, a local subnet mask such as 255.255.255.0 may allow for up to 254 IP addresses to be generated that would be at least valid on that network, even if those addresses are not currently in use. Therefore an the attacker could simulate a number of different networks and subnets that may legitimately lie behind the NAT firewall by randomly generating IP addresses on those nets/subnets and include those addresses in the requests.

Even with the existence of NAT firewalls, it may be possible to determine a threshold number of requests originating from a single IP address that can be considered statistically valid. Any requests above this threshold (usually occurring over a specified period of time) may be ignored. Such a threshold may be determined by looking at advertising specific data (e.g., predicted number viewers) and other statistical data (e.g., average number of user devices behind a NAT firewall for a given country, locality, service provider, IP address range, etc.). A single user would have a difficult time overcoming this limit by using machines in a single network. However, an individual could gain access to a vast number of addresses and devices by distributing malware.

Malware generally refers to software that is installed without the knowledge of the user and performs activity that the use would find objectionable. Classic examples include computer viruses that are specially crafted to propagate among computers and perform some undesirable activity. Another type of malware is called spyware, which secretly logs user activity and sends activity data to a third party. Yet another type of malware are referred to as "bots," which are programs that are distributed to computers (usually a large number of compromised computers, referred to collectively as a "botnet") to "steal" processor and network bandwidth for purposes such as sending spam email and launching distributed denial of service attacks. This list of malware is not exhaustive (e.g., additional types of malware include worms, Trojan horses, backdoors, rootkits, etc.) nor are the types listed mutually exclusive. For example, a botnet may be formed by using computer virus techniques to spread the bot program.

In the realm of click fraud, a botnet could be used to distribute small HTTP (or other protocol) clients that simulate browser activity in order to generate false click-through rates. Generally, this malware would run in the background and consume few resources in order to avoid detection. By using such malware that is widely distributed both in time and number of infected hosts, and appreciable amount of legitimate appearing but fraudulent click-through traffic could be generated. Further, such software could be remotely reconfigured to via the network alter the target URLs to adapt to changing ad materials.

It will be appreciated that perpetrators will find new and inventive ways to outmaneuver anti-click fraud measures. Therefore it would be beneficial to focus efforts both on analyzing actual click-through data, as well as preventing malicious code from operating on the terminal devices. In particular, mobile devices are becoming increasingly popular and powerful, this greatly increasing the number of available devices that can be exploited for such attacks.

As mentioned above, an example of a measure that might be taken to prevent click through attacks from being launched on mobile devices is to assign a unique ID for each terminal. The terminal may include features in hardware or the operating system that generates/stores this ID and ensures that it is applied to certain network transactions. Such a system may easier to implement in mobile devices as opposed to personal computers, because mobile device manufacturers and services providers typically exert substantial control over both the software and hardware configurations of mobile devices. In such a system, the operating system may include a protected module (e.g., through the use of fixed circuits and/or by using digital rights management) that detects browsers and adds the ID to certain requests. This ID could be added, for example, to certain URLs and/or based on standard patterns included in the source documents. Such requests could be redirected to a server that detects the ID and relevant information before passing it on to its eventual target server.

A system that utilizes unique IDs may not be able to detect click fraud where it perpetrated using widely distributed clients (e.g., viruses) sent to unsuspecting users. For example, malicious code could identify itself to the system as a browser, and initiate just a few clicks per day per terminal in cases where multiple clicks are allowed until they reach some threshold of quantity and time. If such malicious code could be spread to thousands, even millions of terminals, the aggregate financial effect could be quite large. If the code could be distributed widely enough, it may need to only run once per terminal to be effective and thereafter could delete its presence, thereby making both detection and forensic analysis difficult.

Distributed malicious click fraud code may make system unique identifiers less effective. Nonetheless, there may be other indicators that allow a device to determine that malicious code is not legitimately acting in response to user inputs. One way is to include hooks into user input device drivers to check for a correspondence between the requests and cursor or key press events. For example, a system could include a modified or extended keypad event handler in the terminal platform software. This handler could communicate directly to a specialized advertising client that tracks and manages terminal advertising. In this way, the advertising client could tell if an ad content request was due to an actual key press or other external hardware driven event.

Although correlating hardware events with network requests may be effective in many situations, it is not without drawbacks. For example, older or less capable hardware may not be capable of easily including such a client due to processor or memory limitations. In those devices, there may be a penalty in system responsiveness or reliability if the user interface devices are being tracked by additional system software. In other cases, it may be difficult to distribute software that acts at such a low level on a mobile device. Although personal computers need a way to easily add and delete drivers to facilitate adding and upgrading hardware, such changes are less commonly needed on mobile devices, and may require updating all of the system software.

As mobile hardware increases in computing capability, the overhead required to monitor input events for additional purposes may become negligible, just as it is for mainstream personal computers. However, it should be noted that many systems already track user interface events to determine "silence" of user input hardware. In particular, mobile devices must be sensitive to power consumption. Therefore, when the system detects that the user has stopped interacting with the system, certain subsystems can be shut down to conserve power. For example, mobile devices often use backlit light emitting diode (LED) displays. These displays typically make up a large portion of the device's power budget, and it is highly beneficial to dim or switch off these displays when the user has stopped interacting with the device.

Therefore, one way to implement click fraud detection is it to rely on the automatic low power level functions of the terminal, such as a low power state of the screen backlight. The backlight is an automatic low power level function implemented in many different terminal platforms. The terminal usually polls the user inputs, and if no input is detected for a predetermined amount of time, the backlight is dimmed or turned off. If a button press or other input is later detected, the backlight goes on. There is usually a system call available (e.g., via an application program interface of the operating system) to check if the backlight is on in the platform. Therefore, one way to check of a legitimate ad content request was made is to detect when a network access event is initiated, and check if backlight is on contemporaneously with the access event. Contemporaneously, in this context, means that the detected backlight state and access event occurred close enough in time given the parameters of a particular system to conclude that the access event could or could not have been due to a user input. If the backlight is not on when the access event is detected, the event may be disregarded and/or reported as a possible fraud to the server.

In reference now to FIG. 1, a block diagram illustrates one implementation of a click fraud prevention implemented in a terminal 102. The terminal 102 generally includes some manner of network hardware 104 usable for connecting to a network 106. An operating system (OS) (not shown) of the terminal 102 includes network drivers 108 and one or more protocol stacks 110 used for communicating via the network hardware 104. A separate instance of the protocol stacks 110 may be included in each individual application, however most modern systems rely on a common service or OS application program interface (API) to ease application development and enhance security. The terminal 102 also includes user input hardware 112 and user input drivers 114 that, analogous to the network hardware 104 and network drivers 108, operate within the OS to receive external data, in this case inputs 116 from a user 118.

The terminal 102 is generally used for running user programs, such as browser 120. As is generally known in the art, the browser 120 responds to user inputs 116 for, among other things, retrieving Web documents via the network 106. As such, the browser 120 may be a vector for click fraud attacks, such as by the use of a malware plug-in 122. A plug-in 122 is a piece of code that is developed by third parties and used to extend the functionality of the browser 120. Another example of a click fraud malware program is a "pseudo-browser" 124, which may be a standalone program that appears to the system as a browser, but generally has no user interface and is designed to run undetected in the background, like a system process or daemon.

In the illustrated terminal 102, an ad connector client 126 may be implemented to control, configure, manage, and monitor ad usage on the terminal 102. The ad connector client 126 may act as a virtual computer in which ad bearing programs (e.g., browsers, messaging clients, email clients, network media players, etc) operate. In other arrangements, the connector client 126 may be implemented as a system service, program, utility, etc., that detects, monitors, and/or controls ad bearing programs without changing the run-time environment of those programs. In any configuration, the ad connector client 126 may monitor and/or filter inputs and outputs of the browser 120 (and related ad bearing programs) in order to detect click fraud activities.

To facilitate detecting network connection requests by the browser 120, the ad connector client 126 may include a network access interface 128 that is accessed by ad bearing programs when initiating network connections. The network access interface 128 may be patterned after the API of the protocol stacks 110, and may pass through any non-ad-related connections to the stacks 110. The ad client connector may also have a user interface access layer 130 that acts as a pass through for user interface events 134 directed to ad bearing programs such as the browser 120.

While in operation, the ad connector client 126 may monitor, by way of the network access interface 128, connection requests for applications registered or appearing as ad bearing programs, such as the browser 120 and malware pseudo-browser 124. A URL or other data related to the request may be checked against an ad database 132 (or by using some other criterion) to see if further processing is needed. If so, the ad connector may check for one or more of a recently received input event (e.g., paths 134, 136) and current power state 138. The current power state 138 may be accessible from a power management module 140 that is part of system utilities 142, which is typically an OS API or service. In this example, the power state 138 may be determined from an LCD backlight controller 144, although other system parameters may be used (e.g., processor operating at a power saving clock speed, video adaptor powered down, etc.).

If the ad connector client 126 detects that a network access event does not occur contemporaneously with an input event 134 and/or normal power state 138, then the connector may choose to discard/deny the connection and/or modify the data so that any servers can flag the data as suspect. The latter option may be preferable where the potential for false positives exists. In that case, it may be better to allow the connection to go through, but flag the connection data as suspect in some established way. The receiving entities may be able to collect additional data related to the connections to determine if the suspect ranking is due to some new contingency that the implementers were unaware of. In either case, the user 118 may be provided with the option of deciding which action to take, such as by a terminal configuration setting or by being alerted.

Generally, the user 118 may be interested to know that illicit activity may be occurring on the terminal. If potential click fraud is detected, the user 118 may be presented with information about what has occurred. This notification may be through user output hardware (not shown) of the terminal, or through messaging (e.g., text message, email). A service provider or system administrator may also be interested in such activity and desire alert messages.

Figure 2:
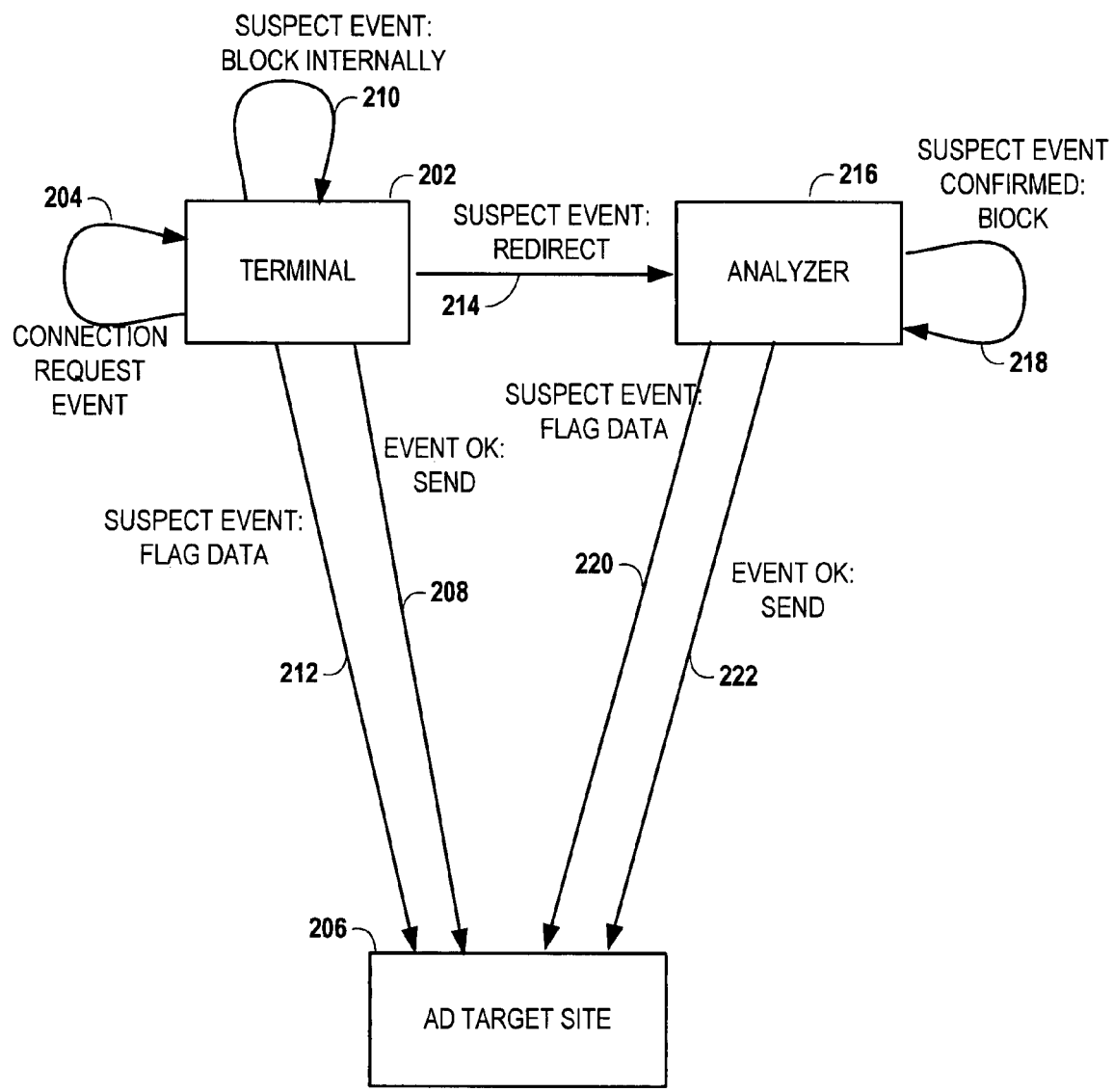
FIG. 2 is a flowchart diagram illustrating system interactions according to an embodiment of the invention.

In reference now to FIG. 2, a system diagram illustrates options for handling suspect ad click events according to an embodiment of the invention. Generally, a terminal 202 examines connection-type events 204 targeted for one or more advertising sites 206. The connection request events 204 may be any of a network connection request, simulated user interface event, etc. The advertising sites 206 may include the ultimate advertisers, and/or any intermediary advertising services. The terminal 202 is configured (as described elsewhere herein) to determine if the connection event 204 is due to a legitimate user interface event. If so, the action resulting from the event is sent 208 to the target 206. Alternatively, the terminal 202 may change the outgoing action, such as by adding a predetermined flag to the data (e.g., add a parameter to a URL, set a value in a cookie) before the data is sent 212 to the target 206. This may enable the target site 212 to detect possible illicit activity, and investigate further.

If the event 204 is suspicious, a number of options may be possible. For example, the terminal 202 may handle the event internally, such as by blocking 210 any outgoing actions (e.g, network requests) resulting from the event 204. Another option that may be taken by the terminal 202 is to redirect 214 any suspect actions to an intermediary server 216 for further analysis. The analysis server 216 may have more up-to-date resources that can be used to determine click fraud events, as well as sources of false positives. Further, the analyzer 216 can receive events from a large number of terminals, and thus be made aware of the existence of the type, quantity, and signatures of distributed malware or other sources of suspicious events. Upon determining the redirected action 214 may be suspect, the analyzer 216 may block 218 the action, or flag and forward 220 the action. If the redirect 214 was a false positive, then the action is sent 222 to the target 206 unchanged.

Figure 3:
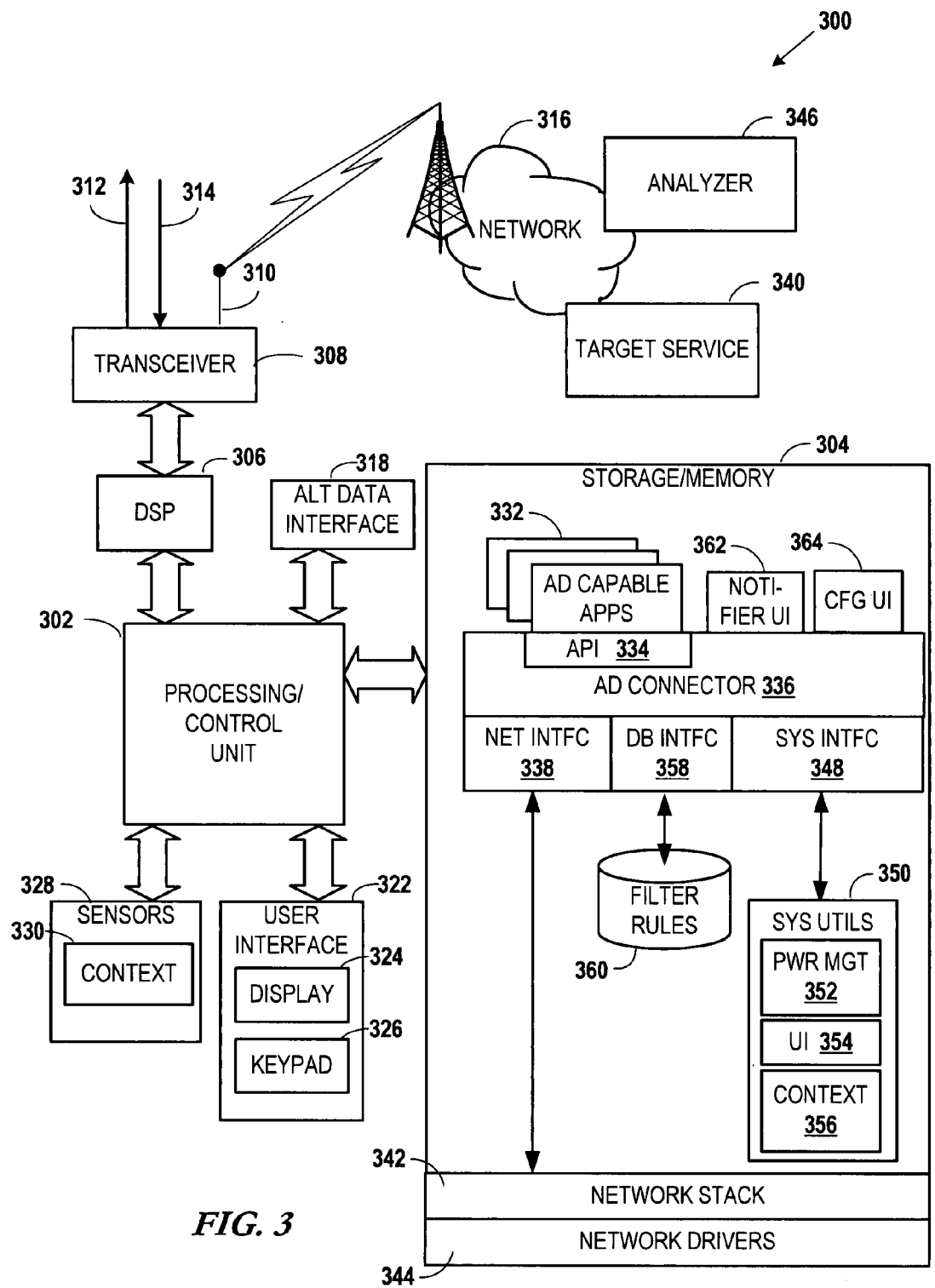
FIG. 3 is block diagram of a mobile computing arrangement according to an embodiment of the invention.

It will be appreciated that a terminal 202 according to embodiments of the invention may be configured to perform combinations of the optional actions when a suspect event is detected. For example, the terminal 202 may both flag and send 212 the action to the target 206 and send a copy 214 of the event/action to an analyzer 216. In such a scenario, the analyzer would typically block 218 any further sending 220, 222 of data to the target 206. It will also be appreciated that the actions taken by the terminal 202 and/or analyzer may differ depending on previous actions taken. For example, if the terminal 202 sends a certain threshold number of flagged suspect actions 212, it may thereafter choose to block 210 further actions from going to the target 206, and/or redirect 214 further actions to the analyzer Many types of apparatuses may be capable of implementing click fraud detection as described herein. Mobile devices are particularly useful in this role. In reference now to FIG. 3, an example is illustrated of a representative mobile computing arrangement 300 capable of carrying out operations in accordance with embodiments of the invention. Those skilled in the art will appreciate that the exemplary mobile computing arrangement 300 is merely representative of general functions that may be associated with such mobile devices, and also that landline computing systems similarly include computing circuitry to perform such operations.

The processing unit 302 controls the basic functions of the arrangement 300. Those functions associated may be included as instructions stored in a program storage/memory 304. In one embodiment of the invention, the program modules associated with the storage/memory 304 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 300 via data signals, such as being downloaded electronically via one or more networks, such as the Internet and an intermediate wireless network(s).

The mobile computing arrangement 300 includes hardware and software components coupled to the processing/control unit 302 for performing network data exchanges. The mobile computing arrangement 300 may include multiple network interfaces for maintaining any combination of wired or wireless data connections. In particular, the illustrated mobile computing arrangement 300 includes wireless data transmission circuitry for accessing wireless networks.

This wireless circuitry includes a digital signal processor (DSP) 306 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 308, generally coupled to an antenna 310, transmits the outgoing radio signals 312 and receives the incoming radio signals 314 associated with the wireless device.

The incoming and outgoing radio signals 312, 314 are used to communicate with a mobile service provider network 316. The network 316 may include any voice and data communications infrastructure known in the art, including CDMA, W-CDMA, GSM, EDGE, EVDO, WiMax, WiFi, etc. The network 316 typically provides access to traditional landline data infrastructures, including IP networks such as the Internet. The mobile computing arrangement 300 may also include an alternate network/data interface 318 capable of accessing the network 316 and/or a proximity network (not shown). The alternate data interface 318 may incorporate combinations of I/O and network standards such as USB, Bluetooth, Ethernet, 802.11 Wi-Fi, IRDA, WiMax, etc. The alternate data interface 318 may be receive-only, and capable of receiving broadcast/unicast digital or analog encoded video, audio, text, and other user perceivable data via wired or wireless media.

The processor 302 is also coupled to user-interface elements 322 associated with the mobile terminal. The user-interface 322 of the mobile terminal may include, for example, a display 324 such as a liquid crystal display. Other user-interface mechanisms may be included in the interface 322, such as keypads 326, speakers, microphones, voice commands, switches, touch pad/screen, graphical user interface using a pointing device, trackball, joystick, etc. One or more sensors 328 may also be coupled to the processor 302. The sensors 328 may include sensor(s) 330 capable of determining terminal context, including any combination of time, location, acceleration, proximity, environmental conditions, electromagnetic/optical transmissions, etc. These and other external interface components are coupled to the processor 302 as is known in the art.

The program storage/memory 304 typically includes operating systems and programs for carrying out functions and applications associated with functions on the mobile computing arrangement 300. The program storage 304 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 304 of the mobile computing arrangement 300 may also include software modules for performing functions according to embodiments of the present invention.

In particular, the program storage/memory 304 may include one or more client applications 332 that facilitate accessing advertising materials (or other materials that are rated by number of access) by a user of the arrangement 300. The client applications 332 can utilize an API 334 of an ad connector component 336. The ad connector component 336 manages advertising access of the multiple applications 332 to network materials in a customizable manner. Although the API 334 and ad connector client 336 are shown as independent system components, in other configurations, the ad connector 336 may be incorporated directly into the applications 332, such as by compiling the applications using shared or static libraries that include the functionality of the connector client 336. Even when the applications 332 include the client 336 functionality, it may be desirable to have a system utility with some client 336 functionality for monitoring relevant activity of all applications 332, in case malware is distributed as a rogue application 332.

The ad connector client 336 includes a number of interfaces for analyzing and managing states and data of the client applications 332. A network interface 338 may track all connections sent to a target service 340 (e.g., ad site) by way of system-level network protocol stacks 342 and drivers 344. The ad connector 336 may determine that a connection is suspect to be a click-fraud type event, and may block such connection, add a flag or other data to the connection request to indicate to the target 340 that the connection is suspect, and/or redirect the connection request to an analyzer service 346 to handle. The ad connector 336 may have other ways of detecting these types of events for malware that does not access the API 334. For example, the ad connector 336 may be capable of directly monitoring one or more of the network stack 342 and drivers 344.

In order to determine whether a connection directed to an ad target 340 is suspect, the ad connector 336 may have a system interface 348 for accessing system utilities 350. The system utilities 350 may include a power management module 352 that can detect power management states that may signal that a user did not or could not access the user interface 322, such as a dimmed or turned off backlight of the display 324. The system utilities 350 may provide data related to the user interface (UI) as represented by UI module 354. Relevant UI data may include data that describes user data input, such as key presses, touch screen selections, cursor movements, voice inputs, motion inputs, etc.

Other relevant data that may be provided by the system utilities 350 is represented by context data module 356. The context module 356. The context module 356 may determine terminal context, either from sensor 330 or current system state, that may be used alone or in combination with data from power module 352 and UI module 354 to determine whether a network event may be click fraud. For example, the context module 356 may access accelerometer data that indicates the arrangement 300 is in a position or orientation where user input is unlikely. In another example, the context module 356 may detect that the user has locked a touch screen display 324, thereby disabling manual input.

The ad connector 336 may be configured to only operate on a subset of connections sent via the network 316, such those connections targeted for a known service 340 that is rated based on the number of individuals who access the service 340. In such a configuration the connector 336 may include a database interface 358 that provides access to a local or network database 360. The database 360 may include criteria (e.g., target URLs) that identify particular requests for further click fraud processing. For example, the advertisers or others who rely on accurate click-through measurements may be willing to pay in order to include their data on the database 360.

The ad connector 336 is preferably user configurable, either directly or via a system utility or application. In the illustrated arrangement 300, a configuration UI component 364 may be used to allow users to change settings, disable/enable the connector 336, associate the connector 336 with particular applications 332, etc. The UI component 364 may be specific to the connector 336, or may be incorporated into applications 332 or utilities 350 using technologies such as Java™ Beans™, ActiveX™, etc. Similarly, a notification UI component 362 may be either standalone or incorporated into other applications. The notification UI component 362 may be activated to inform the user when specific suspect events are detected.

Figure 4:
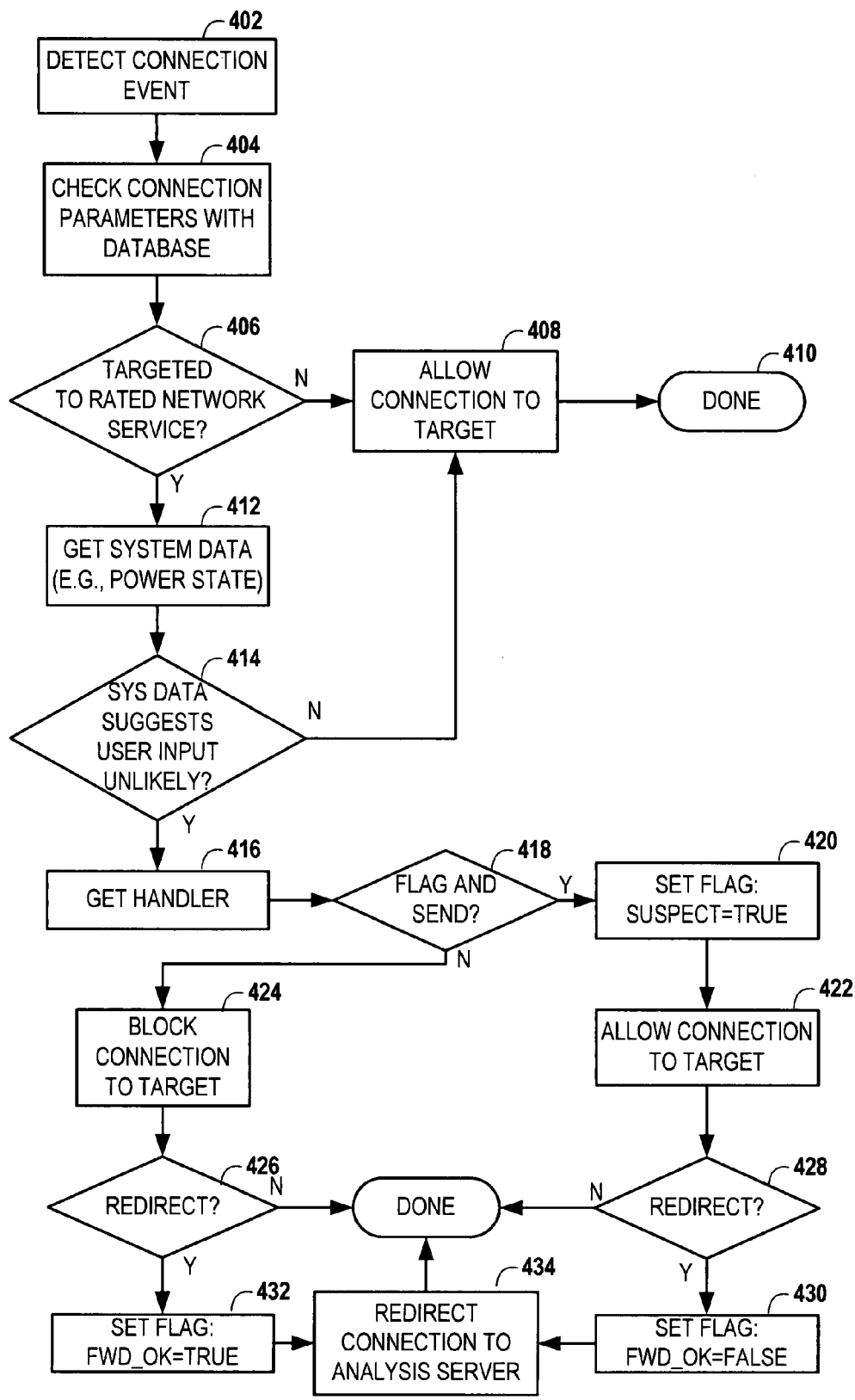
FIGS. 4 and 5 are flowcharts showing procedures according to embodiments of the invention.

In reference now to FIG. 4, a flowchart illustrates a procedure for determining and handling potential click fraud events according to an embodiment of the invention. A connection event is detected 402 by a component of the device such as a connection manager, OS monitoring service, virus/malware scanner, etc. Parameters of the connection are checked 404 against a database to enable determining 406 whether the connection is targeted for a rated network service of interest. Generally, a rated network service includes any service where individual connections are tracked in order to accurately determine a number of individuals that use the service. A typical rated service is an advertising site whose owners pay third parties based on number of people that the third parties direct to the advertising site.

If it is determined 406 the connection is not targeted to a rated service, the connection is allowed 408 to go through and the routine completes 410. If the connection is targeted to a rated service, then data is retrieved 412 that describes a system state on or about the time the connection event was detected 402. One example of such a system state includes a low power state, such as a display backlighting being turned off. If it is determined 414 that it was unlikely the connection was due to user input, a handler is retrieved 416 from, e.g., a system or user configuration. The handler generally describes actions to be taken for a suspect event.

If the handler determines 418 that the connection should be sent to the target, but modified to indicate that it may be suspect, then a flag is set 420 and the connection is allowed 422 to the target. Otherwise, the connection to the target is blocked 424. Whether the connection is blocked 424 or allowed 422, the handler may also dictate that the connection is redirected (or duplicated) to another server that performs analysis on the data. This is represented by decision blocks 426, 428 for respective actions 424, 422. Note that if decision block 428 is "yes," then the procedure may need to inform the analysis server that this connection data is not to be forwarded to the end target, because this was already done at block 422. In this case, a flag "FWD_OK" is set 430 to "false" so that the analysis server does not send the data on to the target.

If the connection was blocked at 424, then it may be acceptable for the analysis server to send the connection on, depending on the criteria used by the analysis server. In that case, the "FWD_OK" flag is set 432 to true, and the connection is redirected 434. Note that the redirection 434 may include a true redirection, in such case the analysis server may act as a proxy to ultimately enable the target service to fulfill the request by the target service. In other cases, such as when "FWD_OK" is set 430 to false, the redirection 434 may involve the sending of data, with no response, or an empty response, expected.

In this flowchart, the handler that is determined at 416 may be a Boolean value that is obtained from a configuration setting. However, it will be appreciated that the handler may also be a function that determines actions to be taken based on the system data retrieved at 412 and based on the particulars of the connection. For example, system data may be combined to form a probability of a given event being click fraud, and individual target services may have different thresholds of probability that govern how target services desire the connections to be handled. In one scenario, assume system data suggests a 60% probability that the connection is due to click fraud. Under such conditions, Target Service A may wish such data to be sent unchanged, thus determination 414 would return "no" and the connection would be allowed 408. However, under the same conditions Target Service B may wish the data to be flagged 420 and sent 422, and Target Service C may wish the connection to be blocked 424 and redirected 434.

Figure 5:
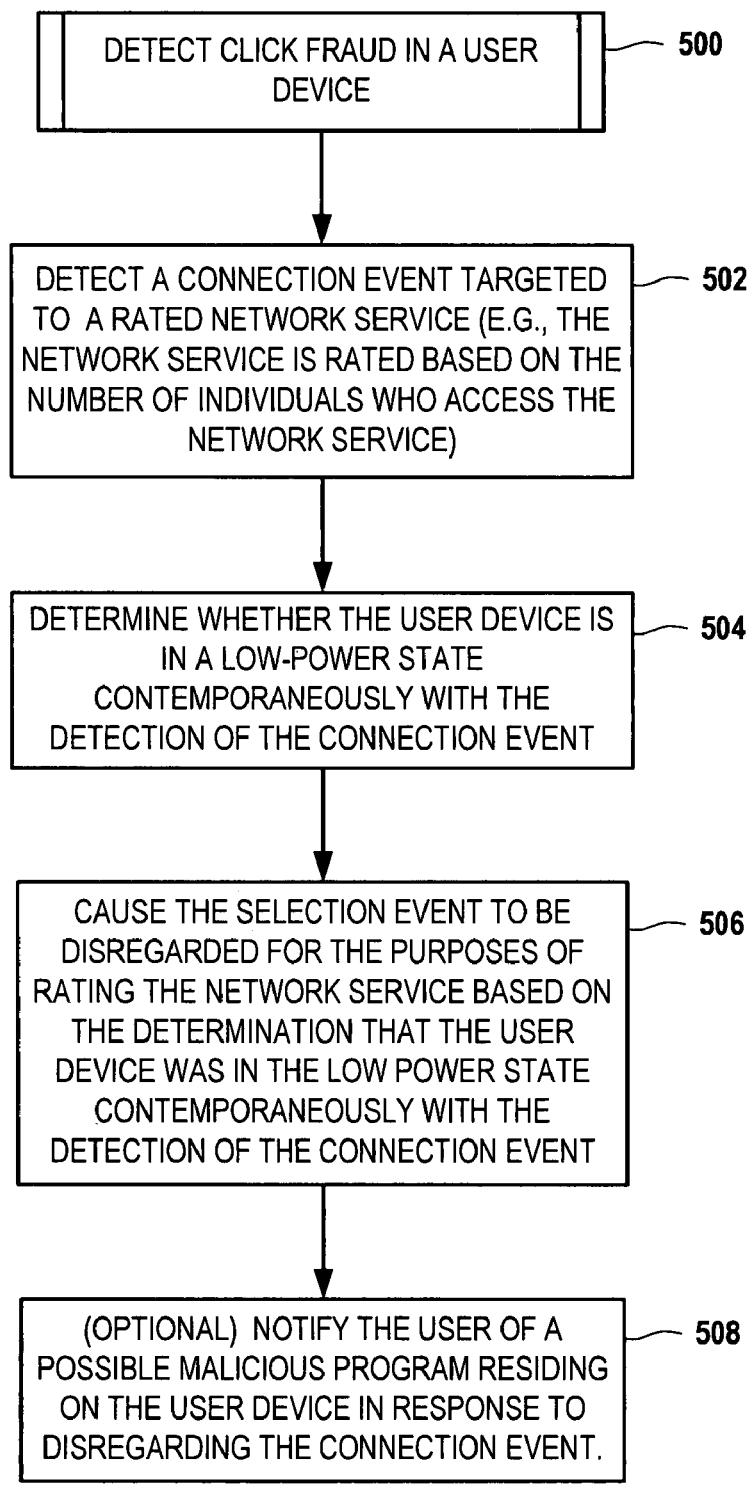

In reference now to FIG. 5, a flowchart illustrates a procedure 500 for detecting click fraud in a user device. A connection event targeted to a network service is detected 502. The connection event is of a type associated with user interface selections, and the network service is rated based on the number of individuals who access the network service. It is determined 504 whether the user device is in a low-power state contemporaneously with the detection of the connection event. The connection event is caused to be disregarded 506 (either by locally blocking the connection or by notifying the target service or some other network entity) for the purposes of rating the network service based on the determination that the user device was in the low power state contemporaneously with the detection of the connection event. The procedure may optionally involve notifying 508 the user of a possible malicious program residing on the user device in response to disregarding 506 the connection event.

Figure 6:
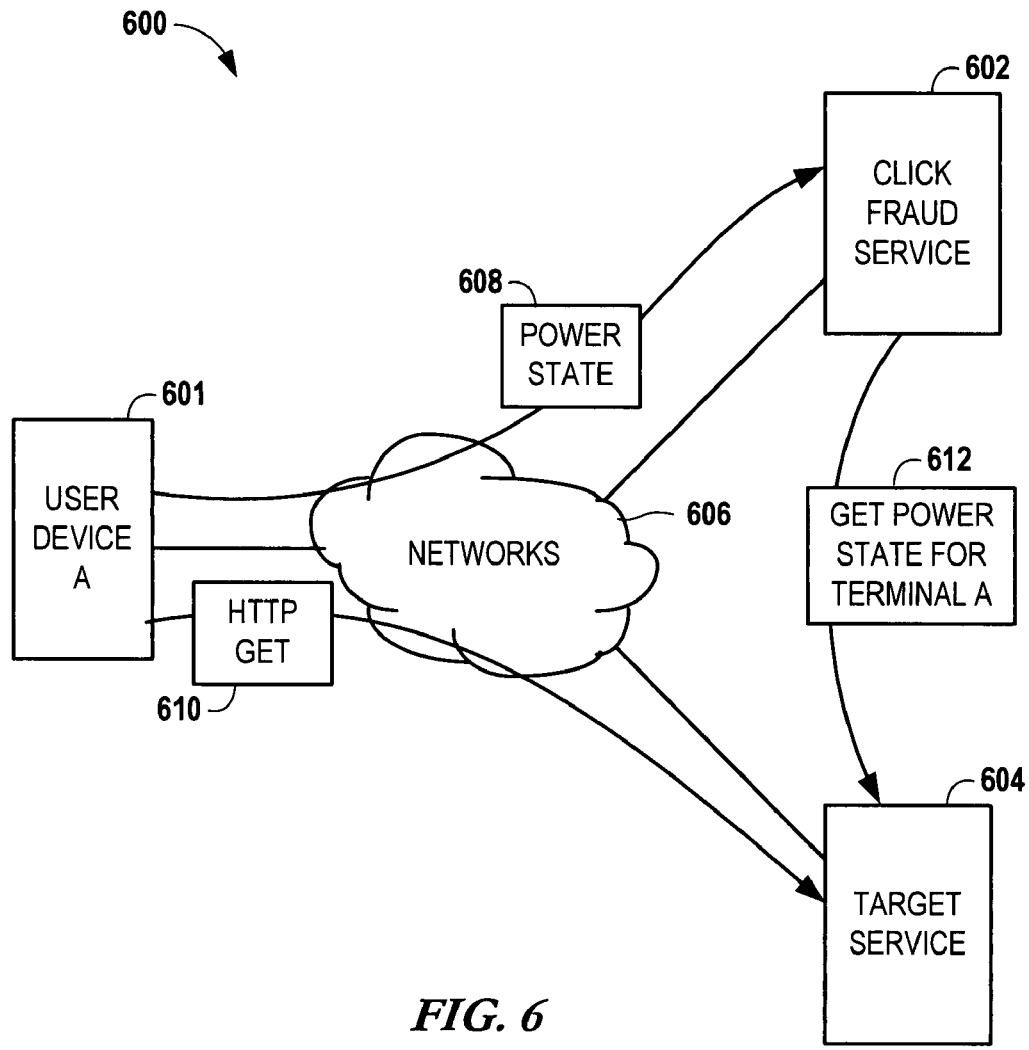
FIG. 6 is a block diagram showing a system according to an embodiment of the invention.

It will be appreciated that the various disclosed embodiments can use combinations of software components that reside partially or fully on mobile user devices such as mobile terminals. It will be appreciated that for already deployed devices and systems, this may require an update of the user devices. In order to avoid having to apply an update, it may be useful in some cases to implement a server-only click fraud detection system. An example server-based click fraud detection system 600 according to an embodiment of the invention is shown in FIG. 6. The system 600 generally includes a user device 601, click fraud service 602, and target service 604 coupled via one or more networks 606.

The services 602, 604 may be separate and independent, or combined into one operational unit. Generally, the click fraud service 602 is enabled to directly or indirectly detect a power state 608 of the user device 601. The detection 608 may involve explicit notification of a power state event happening on the user device 601, such as by an asynchronous (e.g., unsolicited by the server 602) communication originating from device 601, or may result from a request/response sequence initiated by either one of the device 601 and server 602. The detection 608 may be indirect, such as may be derived from certain network states and data related to the device 601. The power state communication 608 may occur at regular intervals, or only in response to some event, such as a state change, network initialization/utilization, etc.

After the click fraud service 602 has determined the power state 608 of the user device 601, the device 601 may be involved in an access event as represented by HTTP GET 610. In response to the access event 610, the target service may obtain power state data 612 related to the originating device 601. This data access 612 may occur before, after, or contemporaneously with the access event 610. Based on the state determined for the device 601, the target service 604 may choose to disregard the event 610 for purposes of rating the target service 604 based on number of accesses.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
   detecting an event, at a user device, is targeted to a network service that is rated based on the number of individuals who access the network service, wherein the event is of a type associated with user interface selections;
   determining whether the user device is in a low-power state contemporaneously with the detection of the event; and
   causing the event to be disregarded for the purposes of rating the network service based on the determination that the user device was in the low power state contemporaneously with the detection of the event, wherein the network service comprises network-based advertising, and the event is disregarded for the purposes of determining advertising fees.

2. The method of claim 1, wherein determining whether the user device is in a low power state comprises determining whether a display of the user device is in a low power state.

3. The method of claim 2, wherein determining whether the display is in a low power state comprises determining whether a backlight of the display is in a low power state.

4. The method of claim 3, wherein determining whether the backlight is in a low power state comprises determining whether the backlight is turned off.

5. The method of claim 3, wherein determining whether the backlight is in a low power state comprises determining whether the backlight is dimmed.

6. The method of claim 1, wherein the event originates from malware installed on the user device, wherein the malware simulates user selection events.

7. The method of claim 6, further comprising notifying the user of a possible malicious program residing on the user device in response to disregarding the event.

8. The method of claim 1, wherein causing the event to be disregarded comprises blocking the event at the user device.

9. The method of claim 1, wherein causing the event to be disregarded comprises adding the data to a network request initiated in response to the event, wherein the added data causes the network request to be flagged as suspect.

10. The method of claim 1, wherein disregarding the event comprises redirecting a network request initiated in response to the event to a network address that is different than an address of the network service.

11. An apparatus comprising:
a network interface;
memory; and
a processor disposed between the memory and the network interface, wherein the memory stores instructions that cause the processor to:
  detect an event targeted to a network service that is rated based on the number of individuals who access the network service, wherein the event is of a type associated with user interface selections;
  determine whether the apparatus is in a low-power state contemporaneously with the detection of the event; and
  cause the event to be disregarded for the purposes of rating the network service based on the determination that the apparatus was in the low power state contemporaneously with the detection of the event, wherein the network service comprises network-based advertising, and the event is disregarded for the purposes of determining advertising fees.

12. The apparatus of claim 11, further comprising a backlit display, and wherein the instructions cause the processor to determine whether the apparatus is in a low power state based on determining whether the backlit display is in a low power state.

13. The apparatus of claim 11, wherein the memory further comprises
malware that simulates user selection events, and wherein the event originates from the malware.

14. The apparatus of claim 13, wherein the instructions further cause the processor to notify the user of a possible malicious program residing on the user device in response to disregarding the event.

15. The apparatus of claim 11, further comprising a database storing rules that determine whether connections to a particular network entities should be analyzed, and wherein the instructions cause the processor to determine whether the apparatus is in the low-power state contemporaneously with the detection of the event only if the event is targeted to one of the particular network entities.

16. The apparatus of claim 11, wherein the instructions cause the event to be disregarded by blocking a network request from being sent via the network interface in response to the event.

17. The apparatus of claim 11, wherein the instructions cause the event to be disregarded by adding data to a network request that is sent in response to the event, wherein the added data causes the network request to be flagged as suspect.

18. A computer-readable storage medium having instructions executable by a processor of an apparatus for:
detecting an event targeted to a network service that is rated based on the number of individuals who access the network service, wherein the event is of a type associated with user interface selections;
determining whether the apparatus is in a low-power state contemporaneously with the detection of the event; and
causing the event to be disregarded for the purposes of rating the network service based on the determination that the apparatus was in the low power state contemporaneously with the detection of the event, wherein the network service comprises network-based advertising, and the event is disregarded for the purposes of determining advertising fees.

19. An apparatus comprising:
means for detecting an event targeted to a network service that is rated based on the number of individuals who access the network service, wherein the event is of a type associated with user interface selections;
means for determining whether the user device is in a low-power state contemporaneously with the detection of the event; and
means for disregarding the event for the purposes of rating the network service based on the determination that the user device was in the low power state contemporaneously with the detection of the event, wherein the network service comprises network-based advertising, and the event is disregarded for the purposes of determining advertising fees.

20. A system comprising:
a network service accessible via a network, wherein the network service is rated based on the number of individuals who access the network service; and
a user device capable of accessing the network and comprising memory and a processor coupled to the memory, wherein the memory stores instructions that causes the processor to:
  detect an event targeted to the network service, wherein the event is of a type associated with user interface selections;
  determine whether the user device is in a low-power state contemporaneously with the detection of the event; and
  cause the event to be disregarded for the purposes of rating the network service based on the determination that the user device was in the low power state contemporaneously with the detection of the event, wherein the network service comprises network-based advertising, and the event is disregarded for the purposes of determining advertising fees.

21. The system of claim 20, further comprising an analysis server, and wherein the user device causes the event to be disregarded for the purpose of rating the network service by redirecting a network connection opened in response to the event to the analysis server.

22. The system of claim 21, wherein the analysis server makes an independent determination of whether the event should be disregarded for the purposes of rating the network service.

* * * * *